(12) United States Patent
Chien et al.

(10) Patent No.: US 6,404,753 B1
(45) Date of Patent: Jun. 11, 2002

(54) METHOD AND APPARATUS FOR CONTROLLING ACCESS TO A COMMUNICATION CHANNEL

(75) Inventors: Herman Chien, Redmond, WA (US); Kin K. Leung, Edison, NJ (US)

(73) Assignees: AT&T Corp., New York, NY (US); AT&T Wireless Services Inc., Redmond, WA (US)

( * ) Notice: Subject to any disclaimer, the term of this patent is extended or adjusted under 35 U.S.C. 154(b) by 0 days.

(21) Appl. No.: 09/148,316

(22) Filed: Sep. 4, 1998

(51) Int. Cl.[7] .................................................. H04Q 7/20
(52) U.S. Cl. ..................... 370/337; 370/348; 370/443
(58) Field of Search ................................. 370/329, 336, 370/337, 345, 347, 348, 442, 443

(56) References Cited

U.S. PATENT DOCUMENTS 5,012,469 A * 4/1991 Sardana ........................ 370/322
5,570,355 A * 10/1996 Dail et al. .................... 370/352

OTHER PUBLICATIONS

A. Chockalingam et al., "Performance of a Wireless Access Protocol on correlated Rayleigh–Fading Channels with Capture," *IEEE Transactions on Communications*, vol. 46, No. 5, May 1998, pp. 644–655.

* cited by examiner

*Primary Examiner*—Melvin Marcelo
(74) *Attorney, Agent, or Firm*—Kenyon & Kenyon

(57) ABSTRACT

A method and an apparatus provide for controlled access to a shared communication medium. Time slots on a forward channel include information regarding status useful for remote units to determine whether a reverse channel is available for seizure. Additionally, information along the forward channel provides guidance to the remote units to control attempts to seize the reverse channel. In one embodiment a remote unit divides a data package into a plurality of portions and attempts to seize the reverse channel using a single portion of the data package which corresponds to one time slot on the reverse channel. It then waits until it receives notification along the forward channel that the first data portion was successfully received before it attempts to send any of the remainder of its data in consecutive time slots on the reverse channel.

11 Claims, 14 Drawing Sheets

METHOD AND APPARATUS FOR CONTROLLING ACCESS TO A COMMUNICATION CHANNEL

FIELD OF THE INVENTION

The present invention is directed to a method and apparatus for controlling access to a communication channel. In particular, the present invention provides method and apparatus by which multiple users can coordinate their use of a shared transmission medium.

BACKGROUND

It is well known in the art to provide a transmission medium to be shared by a plurality of communication devices. One example of an arrangement which relies on such sharing of communication resources is a wireless communication system. An -One commonly known wireless communication system comprises wireless mobile networks wherein users having communication devices may move throughout wireless communication service areas and conduct communications via over the air links. Yet another wireless communication configuration has been proposed as an alternative to wireline communications that provide local access to telephone switching networks. For example, it has been proposed to provide an arrangement referred to as "fixed wireless" by which homes or locations could be provided with a remote unit or terminal that enables the transmission and receipt of wireless communications, as an alternative or an adjunct to a wireline connection to a local exchange carrier. The remote unit would communicate with a base station via an air link to provide access to a local telephone network.

An example of a fixed wireless configuration is illustrated in block diagram form in FIG. 1. In this arrangement a base station 100 is coupled to a local switch which can include, for example, a No. 5 ESS provided by Lucent Technologies and/or other components such as a local switch 120. The local switch could be a voice switch or a data switch. The base station includes a transmitter, a receiver and a switch interface. The transmitter and receiver act as an air link interface to a plurality of remote units for example remote units 111, 112, 113, 114 and 115. The base station also includes certain processing and memory capabilities which control the operation of the base station in accordance with the methods and techniques described below. The remote units can be coupled to various communication devices such as telephones in the case of remote units 111, 113 and 114, a computer and modem in the case of remote unit 112 and a fax machine in the case of remote unit 115. The remote units also include transmission and receiver elements which act as an air link interface to the base station. Furthermore, a remote unit includes a processor and a memory which together control the air link interface in accordance with the type of communication device connected to the remote unit as well as in accordance with the methods and techniques of the present invention as described below.

In a configuration known prior to the present invention the base station communicated to remote units using a forward channel comprising a plurality of time slots such as that illustrated in FIG. 3. In the illustration, eight of those time slots, $T_A$ to $T_H$, are shown as consecutive time slots along the forward channel. When the base station transmits these time slots over the air link, all of the remote units serviced by the base station receive these time slots and can process them accordingly. In addition to the forward channel of FIG. 3, the air link that carries communications to the base station from the remote units is a shared resource referred to as the reverse channel. This shared resource also utilizes a plurality of time slots, some of which are shown in FIG. 2 as time slots $T_1$ to $T_8$, for carrying information from various remote units to the base station.

A problem arises in this configuration in that as remote units detect that the reverse channel is free, multiple remote units may attempt to seize the reverse channel by transmitting data in the same time slots on the reverse channel. This problem will be better understood with reference to FIG. 4.

The time slots on the forward channel in FIG. 4 contain at least two bits of information. One bit labeled the B/I (busy/idle) bit provides status information as to whether the base station is capable of receiving data in a time slot along the reverse channel. Equivalently, this is an indication that the reverse channel is free for use by one of the remote units. In one example if the B/I bit is "0" this indicates that the base station is idle or the reverse channel is free while if the B/I bit is equal to "1" then this indicates that the base station is busy or the reverse channel is not available. A second bit, the D bit, is directed to the status of whether the base station has successfully decoded the data in a received time slot. A failure to decode received data may result from either a collision of two remote units inserting data into the same time slot or from other transmission errors. Again, for purposes of this application when the D bit equals "0" this means that the base station has not successfully received the data in the time slot and when the decode bit equals "1" this means that the base station has successfully decoded and hence successfully received data from one of the remote units. In the example shown in FIG. 4 time slots $T_B$ and $T_C$ have bits B/I and D equal to zero. If a remote unit notes that the B/I bit is zero, then it understands that the base station is accessible. In this instance remote unit one (RU1) attempts to transmit data in a time slot $T_3$. This time slot must be propagated to the base station, processed by the base station and then a responding time slot transferred back along the forward channel to the remote units.

The time between a remote unit's transmission of a data packet in a time slot on the reverse channel and receipt of a response to that transmission by the remote unit is referred to as a "round-trip" time interval. From system to system the "round trip" time interval may vary depending on the hardware and software implementations. Within a given system however, it is presumed that this delay interval is fixed and is known to the base station and the associated remote units.

An example of the round trip time interval is illustrated in FIG. 4 by the fact that the B and D bits in the time slots on the forward channel remain as zero for two time slots ($T_D$ and $T_E$) beyond the first time slot in which RU1 transmits data, namely time slot $T_3$. It is not until $T_F$ that there is any indication that data from the remote unit has been received at the base station. In this instance time slot $T_F$ indicates that the data in time slot $T_3$ has been successfully decoded.

Problems can arise because of the round trip delay. Despite the fact that RU1 has attempted to seize the reverse channel in time slot $T_3$, remote unit 2 (RU2) believes, based on the contents of time slots $T_D$ and $T_E$, that the resources, (namely the reverse channel and the base station) are available to receive data packets from RU2. As a consequence, RU2 may elect to transmit its data package starting in time slot $T_4$. If that occurs then data from both remote units RU1 and RU2 may appear in time slots $T_4$ and $T_5$ for instance. If one of those sets of data is not received with significantly more power than the other then it is likely that the data in time slots $T_4$ and $T_5$ will not be successfully decoded. This fact is reflected in time slots $T_G$ and $T_H$ where the B/I bit is set to "1" but the D bit is set to "0".

Additional delay can appear in the systems as well if the time necessary for the remote unit to process a response is not negligible in comparison. For example, assume that three reverse channel time slots elapse before the remote unit can act on information received in a forward channel time slot. In such a case, referring to FIG. 4, if RU1 had data available for transmission at time $T_1$ and $T_A$ had the B/I at "0", RU1 would not transmit data until slot $T_4$ because it would take RU1 time slots $T_1$ to $T_3$ to process the information in slot $T_A$.

It would be beneficial to provide the ability to control the plurality of remote units so as to reduce the likelihood of collision. By reducing the likelihood of collision more of the reverse channel time slots can be used to successfully transmit data to the base station.

SUMMARY OF THE INVENTION

The present invention provides method and apparatus for controlling attempts to seize a shared communication channel. In particular, the present invention provides a technique by which time slot allocation along a transmission medium can be better managed.

In one embodiment of the present invention a remote unit monitors the forward channel to detect the status of the reverse channel. When it detects that the reverse channel is free or that the base station is idle, then it sends a first data portion of a data package wherein the first data portion takes up only one time slot on the reverse channel. The remote unit then continues to monitor the forward channel to determine two pieces of information. First it determines whether in time slots that precede a round trip time slot, there is any indication that any other remote units have transmitted data prior to this remote unit's transmission of a single time slot. The second piece of information which is detected is the status of bits in the round trip time slot on the forward channel which indicate whether the data transmission from the remote unit was successful. If it is determined that no other remote units have transmitted immediately prior to the given remote unit's transmission, and the initial data portion has been successfully received by the base station, then the remote unit begins transmission of the remainder of the data package in a plurality of slots along the reverse channel. If the remote unit detects, however, that either another remote unit has transmitted a data package immediately prior to the given remote unit or the first data portion was not successfully received, then the remote unit will begin to look for idle status in a time slot on the forward channel before it attempts to send data to the base station.

The method of the present invention enhances throughput on the reverse channel by reducing the number of collisions that occur on the reverse channel. A remote unit only transmits a small portion, a single time slot, of its data package in an attempt to seize control of the reverse channel. It then transmits the remainder of its data after it has determined that it has seized the channel. The remainder of the data can be in consecutive time slots as in some orderly arrangement or pattern of time slots. Thus, collisions are reduced to those time portions where single data packages or time slots attempt to seize control of the reverse channel at the same time.

In a variation of the present invention, the remote unit again delays the transmission of the remainder of the data package until it has seized control of the reverse channel. In addition, in an effort to reduce the number of time slots lost due to the round trip delay, once a remote unit begins to transmit the remainder of its data package, each time slot in the transmission indicates whether the remaining portion of the data package is greater than the round trip interval. This can be accomplished with a flag or other indicator in the time slot on the reverse channel. When the base station receives a time slot that indicates that the remaining portion of the data package is less than the round trip delay, then the base station will change the busy/idle status to indicate that the reverse channel is free and the base station is idle even though additional time slots of data have yet to be received from the remote unit. This look ahead capability provides that almost immediately contemporaneous with the completion of the transmission from the remote unit which had seized the reverse channel, all of the remote units receive an indication that the reverse channel is now free. This avoids inefficiencies that might otherwise arise from a plurality of time slots going unused on the reverse channel due to the round trip time interval that occurs after the transmission of the last portion of a data message from a first remote unit.

In yet another variation of the present invention the remote units can keep track of their priority for seizing the reverse channel. In accordance with this variation, a remote unit monitors the time slots between the transmission of a first data portion and the round trip time slot associated with that transmission and determines how many of those time slots indicate that a data portion has been successfully received at the base station. Each time a time slot includes such an indication this means that there is one additional remote unit ahead of the monitoring remote unit in line for seizing the reverse channel. Following the expiration of the round trip interval, assuming that the round trip time slot on the forward channel indicates that the remote unit's first data portion was successfully received, the remote unit then monitors each occurrence of an indication that a transmission has ended. These indicators are also provided in time slots on the forward channel by the base station. Each occurrence of an end of transmission results in decrementing the count of remote units having priority over the given remote unit by one. Eventually the remote unit determines that it is next in line to seize the reverse channel when status indicators indicate that the reverse channel is available. This last variation of the present invention can be modified to include the look ahead notion of the first variation so that the remote unit will not only keep track of its place in line for seizing the reverse channel, but it will seize the reverse channel in approximately the first time slot available on the reverse channel.

These methods and the apparatus for implementing these methods provide improved throughput along a shared communication medium.

DETAILED DESCRIPTION

Figure 1:
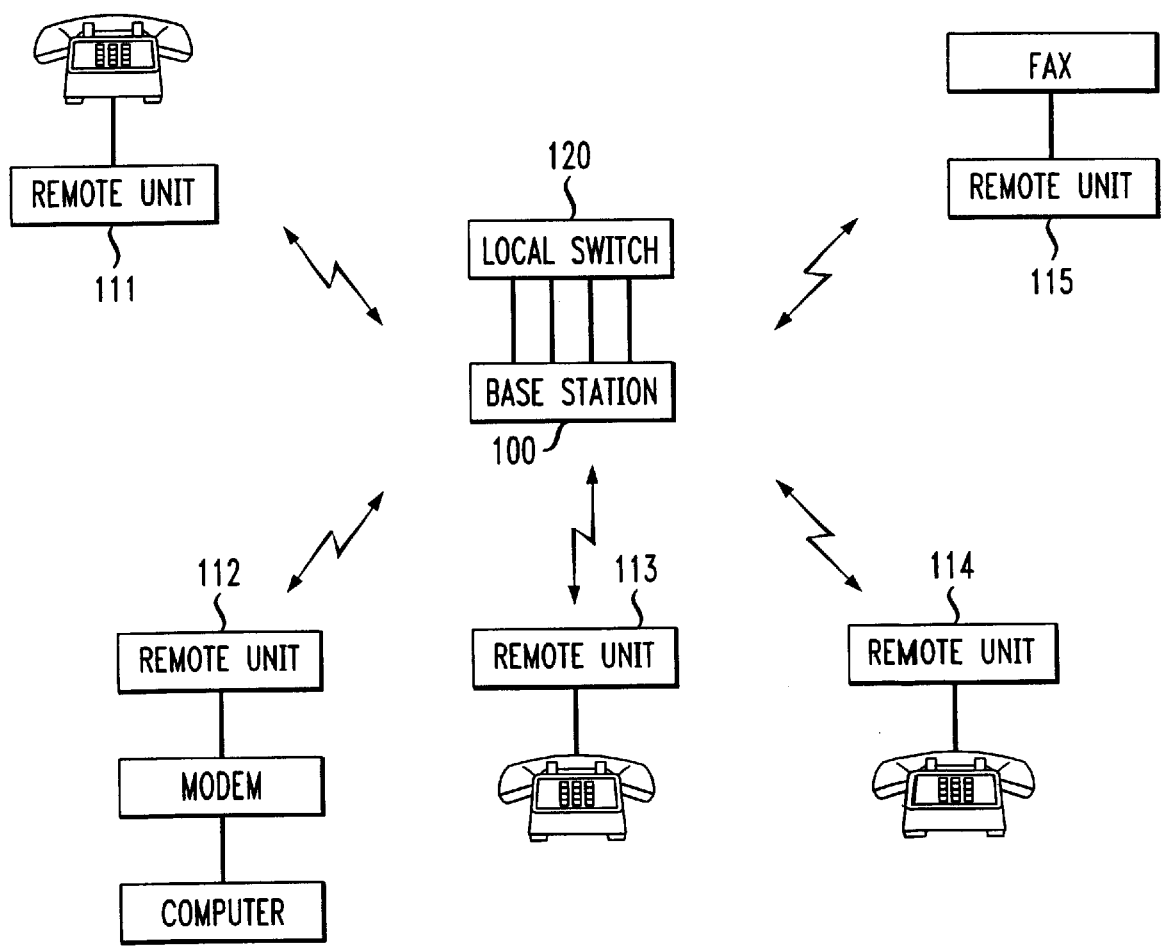
FIG. 1 illustrates in block diagram form a wireless network configuration in which the present invention may be employed.
Figure 2:
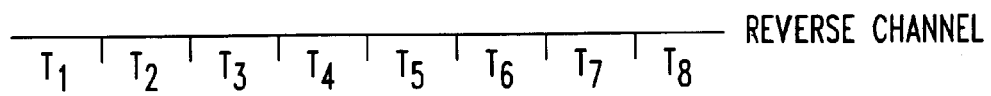
FIGS. 2 to 4 illustrate time slot representations of communication media for purposes of describing known transmission schemes.
Figure 3:
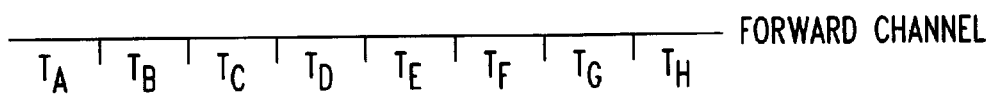

The present invention provides an improved control of remote unit attempts to seize a shared communication medium such as a reverse channel in an air link such as that shown in FIG. 1. A description of how the time slot contents reflect the implementation of the present invention will first be described with respect to FIG. 5 and then processes for effecting these time slot assignments in the remote unit and the base station will be described with reference to FIGS. 8 and 9.

Figure 4:
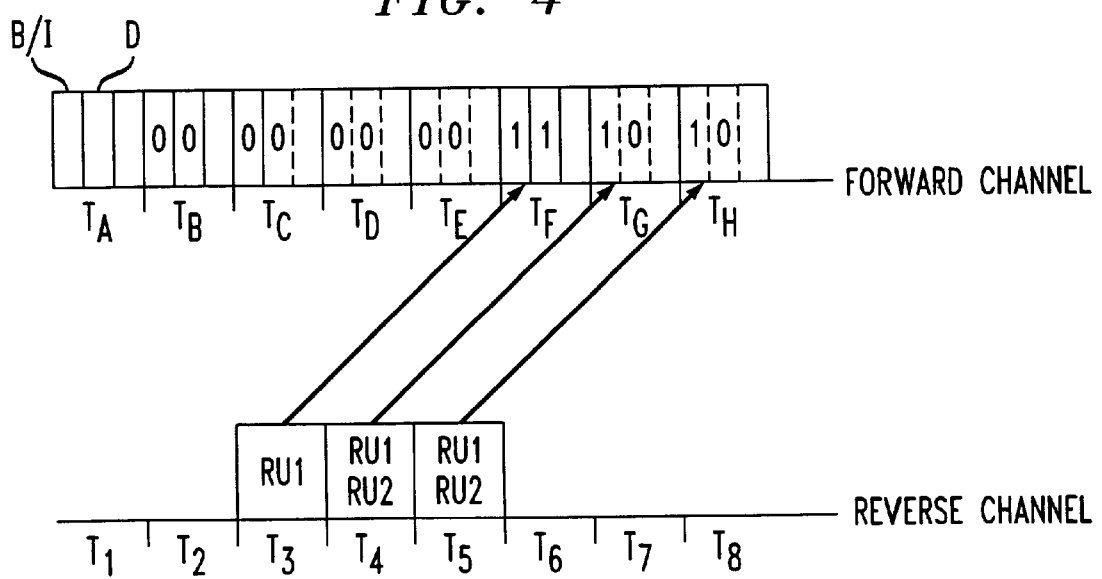
Figure 5:
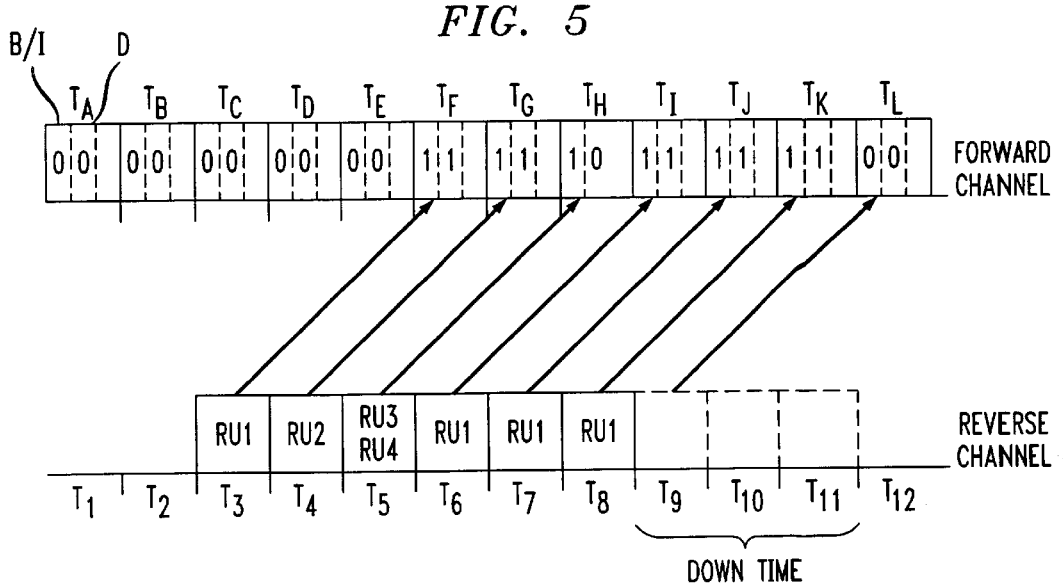
FIG. 5 provides a time slot representation of transmissions along communication media in accordance with a first embodiment of the present invention.

As shown in FIG. 5 there is a forward channel which carries transmissions from the base station to the plurality of remote units. A number of time slots, $T_A$ to $T_L$ are illustrated. As in the prior art referred to with regard to FIG. 4, each time slot on the forward channel includes at least two flags, here shown as the B/I bit and the D bit. The B/I bit is representative of the busy/idle status of the base station and/or the reverse channel. The D bit is indicative of whether data received in a time slot has been successfully decoded. In the exemplary implementation it is presumed that the round trip time slot interval, that is the number of time slots that elapse during the time it takes for a time slot on the reverse channel to be propagated to the base station, processed at the base station and a return time slot on the forward channel propagated to the remote unit and processed by that unit is presumed to be three time slots. In this example the round trip time slot is that time slot that arises after all of the processing of a received package data slot is completed. Alternatively, the base station might be able to detect receipt of a time slot more quickly than it decodes the slot. In such a case the shortest round trip time interval would correspond to the time slot at which the B/I bit can be changed by the base station while a longer round trip time interval would correspond to the time slot in which the base station indicates the successfulness of the decode attempt. The number of time slots could vary from system to system but within a system is considered fixed and known to all terminals. The length of the round trip time interval can be dependent on the time for propagation or the time for processing. In one embodiment of a wireless network configuration such as that shown in FIG. 1 it is presumed that the processing time at the base station is far more dominant than the propagation time. In such a circumstance then the location of the remote unit vis-a-vis the base station is not important and it can be presumed that all of the remote units serviced by the base station will see the same round trip interval, here three time slots.

In this embodiment of the present invention when remote unit RU1 detects that the B/I and D bits are equal to zero, thereby indicating the availability of the reverse channel, such as in time slot $T_C$, the RU1 sends a first portion of a data package which it wishes to transmit to the base station. The first portion corresponds to one time slot, here $T_3$, in the reverse channel. The remainder of the data package which is to be sent to the base station is held back at RU1 until that remote unit is certain that it can send the remainder of the data package. The remote unit then monitors the time slots along the forward channel during the round trip time interval, here time slots $T_D$, $T_E$ and $T_F$. In time slots $T_D$ and $T_E$ the B/I bit and the D bit both remain in the zero state thereby continuing to reflect an availability of the reverse channel. Forward time slot $T_F$ representing the round trip time slot for the reverse channel time slot $T_3$, indicates that the data in slot $T_3$ transmitted by remote unit RU1 was successfully received at the base station and the status of the base station/reverse channel has been changed as well, as reflected by the fact that the B/I bit and the D bit now contain the value "1". Then, since RU1 detects that its first data package has been successfully received based on the contents in time slot $T_F$ and that no other remote unit had attempted to seize the reverse channel prior to RU1, as evidenced by the content of time slots $T_D$ and $T_E$, RU1 begins to transmit the remainder of its data package in a plurality of portions over a plurality of time slots such as consecutive time slot $T_6$ to $T_8$.

It is worth noting that in this embodiment the processing time at the remote unit is presumed to be insignificant such that RU1 begins transmitting the remainder of its data package at a time slot nearly contemporaneous with the appearance of information in time slot $T_F$.

Figure 17:
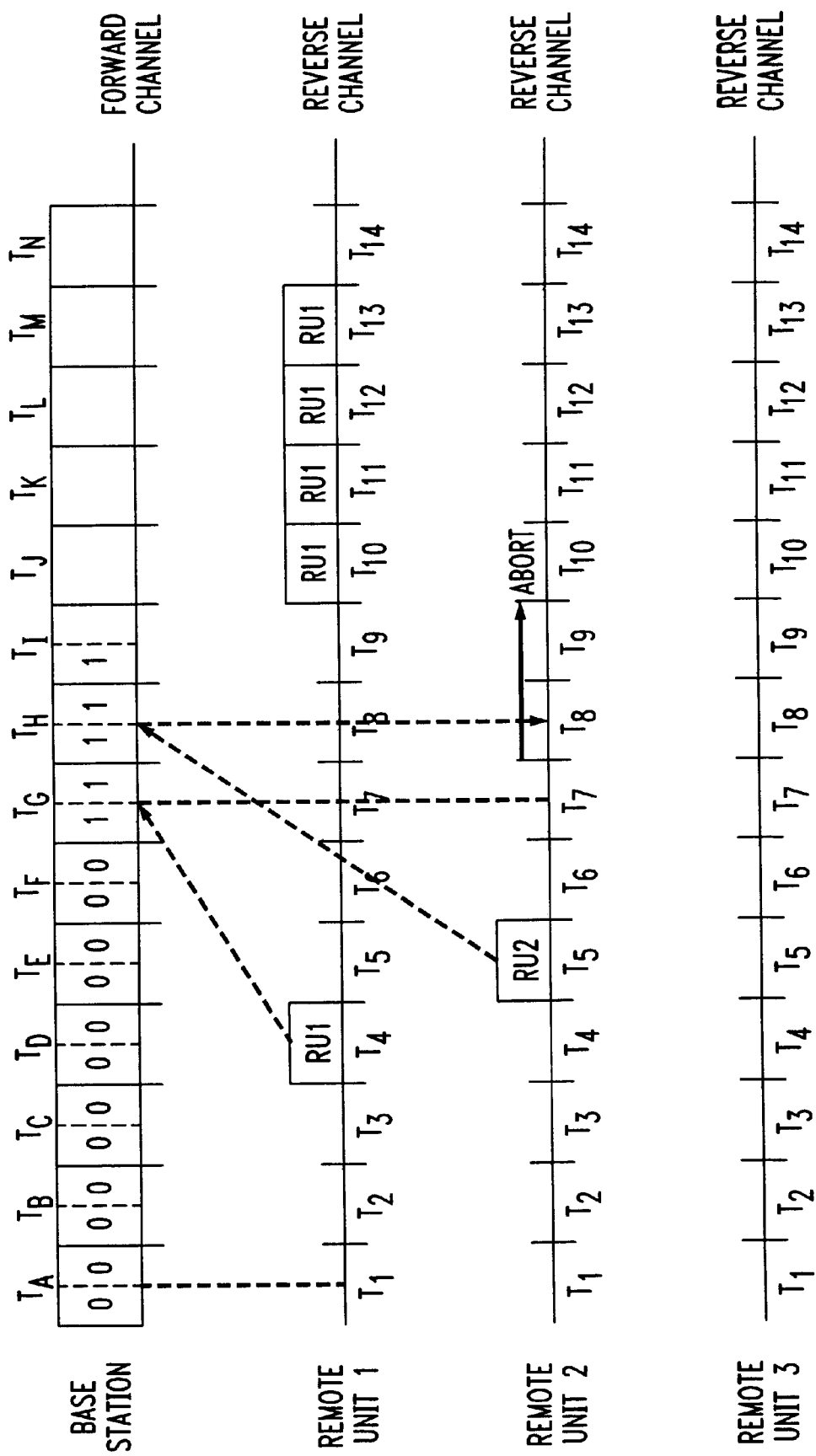
FIG. 17 illustrates a time slot representation of transmissions along communication media in accordance with yet another variation of the present invention.

A different scenario is illustrated in FIG. 17 where it is presumed that the base station processing time, the remote unit processing time are nearly equal and determined to be 3 time slots. If the base station has a B/I bit status of idle, RU1 has a data package available at time $T_1$, RU2 has a data package available at time $T_2$ and RU3 has a data package available at $T_9$ the following occur:

1. RU1 sends one time slot of data at time slot $T_4$.
2. RU2 sends one time slot of data at time slot $T_5$.
3. At $T_G$ on the forward channel the remote unit sets B/I as busy and the decode bit indicates "successful".
4. At $T_{10}$ RU1 completes processing of the data of $T_G$ begins to send the rest of its data package.
5. At $T_H$ on the forward channel the remote unit sets B/I as busy and the decode bit indicates successful.
6. At $T_{10}$ RU1 completes processing of the data of $T_G$ and aborts its transmission because it determines some other remote unit has successfully seized the channel.

Without modification the B/I bit on the forward channel would revert to idle status at $T_1$ in the absence of any transmission in $T_6$ on the reverse channel. If this happens then RU3, sensing idle status, would attempt to transmit a first portion of data in time slot $T_{12}$. Unfortunately, this is during the block of time slots that $RU_1$ is using to send the remainder of its data package.

To remedy this the base station can, upon receipt of a first portion of data, such as the data T4, artificially set all of the following forward channel B/I bits starting at $T_G$ to "high" to indicate busy, even in the absence of data in a slot on the reverse channel. This could be implemented in the base station using a counter. In this implementation when the base station detects a status change from idle to busy it automatically sets the B/I bit "high" and keeps it high for a time period of at least one round trip interval. Then it allows the B/I bit to float to reflect the actual status of the reverse channel. If this was implemented then the base station would hold B/I high for $T_1$ and RU3 would not attempt to transmit its first portion of data while RU1 was transmitting its remaining portions.

To accommodate this remedy the data packets can be constructed by the remote units such that the base station can distinguish between "first-portion" data and remainder data.

Also, note that in the arrangement of FIG. 5, because of the B/I bit status in time slot $T_D$, remote unit RU2 believes that the reverse channel is available and sends a first portion of its own data package to the base station. Successful receipt of that data package is indicated by the flag states in forward channel time slot $T_G$. RU2, despite this indication in time slot $T_G$, does not begin to transmit the remainder of its data package in time slot $T_7$ because RU2 has detected that another remote unit has seized the channel before RU2. It detects this from the contents of the time slots within the round trip interval after its transmission in time slot $T_4$. More specifically, time slot $T_F$, which precedes $T_G$ the round trip time slot for $T_4$, reflects the fact that another remote unit, here RU1, has successfully seized the reverse channel prior to RU2. Thus, RU2 holds off any further transmissions until such time as it is advised that the reverse channel is available.

The time slot illustration in FIG. 5 also illustrates the occurrence of a collision in time slot $T_5$ wherein remote unit RU3 and remote unit RU4 believe, based on the content of the flags in times slot $T_E$ that the reverse channel is available. Both remote units attempt to transmit. The round trip time slot on the forward channel corresponding to $T_5$, that is, $T_H$, hereby reflects that the reverse channel is busy (B/I bit is "1"), but the received data was not successfully decoded and thus the transmissions by RU3 and RU4 were not successfully received by the base station. RU3 and RU4 take note of this fact, and implement a re-try strategy as described below. RU1 and RU2 may ignore the decode failure flag that reflects the collision of the initial slot transmission of RU3 and RU4 since the failure flag occurs in the middle of RU1's and RU2's respective round trip delay during which they understand that they are not sending anything requiring successful decoding.

The wireless system in which the present invention is employed should be designed to address the occurrence of collisions and failed attempts to seize the reverse channel. This can be done by implementing a specific re-try strategy. The particulars of such a strategy may be developed given design trade-offs that are of concern to the service provider, but such particulars do not limit the application of the present invention.

In one re-try strategy that might be employed, data sent from a remote unit may be sequentially and source identifiable, such as by stamping each slot of data with information identifying the sender and sequence number of the slot in the order is was intended to leave the sender, then the base and remote unit may use successfully transmitted initial slots and supplement those slots with remaining data at any time the remote unit is again able to regain channel access. In this case, for example, since the first portion of the data package to be transmitted by RU2 has been successfully received by the base station, RU2 need not retransmit its first data portion. Instead, when RU2 detects that the reverse channel is available it may again attempt to seize the reverse channel using a second portion of its data package. That is, the an entire batch of slots can be incrementally transmitted using any combination of initial slots and groups of slots following seizure.

According to another re-try strategy, data sent from a remote unit may be less strongly identified, i.e., if a base receives data in slot 10 and at a later time the sending remote unit finally succeeds in regaining channel access and sends the remaining data in slots 125 to 130, the base has no way of associating the disjoint bursts and reforming the original complete transmission and associating it with the sending remote unit. In this case, an entire batch of slots is retransmitted starting from the first slot of a batch if any failure occurs. In general, either of the above framing and retry strategies, or others, may be used with the access approach described herein.

In the example of FIG. 5 the reverse channel time slots during the round trip interval ($T_4$ and $T_5$) are filled by other remote units. If, however, those channels were empty, their corresponding round trip time slots on the forward channel ($T_G$ and $T_H$) would have B/I bits indicating idle status. If so then a remote unit other than RU1 might attempt to transmit in either $T_7$ or $T_8$ which could disturb RU1's transmission. To avoid this problem the system can incorporate the earlier described notion of forcing the B/I bit high upon detection of the first time slot from RU1. More particularly, the base station, upon receipt of RU1's first data packet forces the B/I bit high for the corresponding round trip time slot plus a number of additional time slots equal to the round trip time interval. Thus, even in the absence of data in time slots $T_4$ and $T_5$ on the reverse channel, the B/I bits in forward channel slots $T_G$ and $T_H$ would still indicate a busy status.

Figure 8:
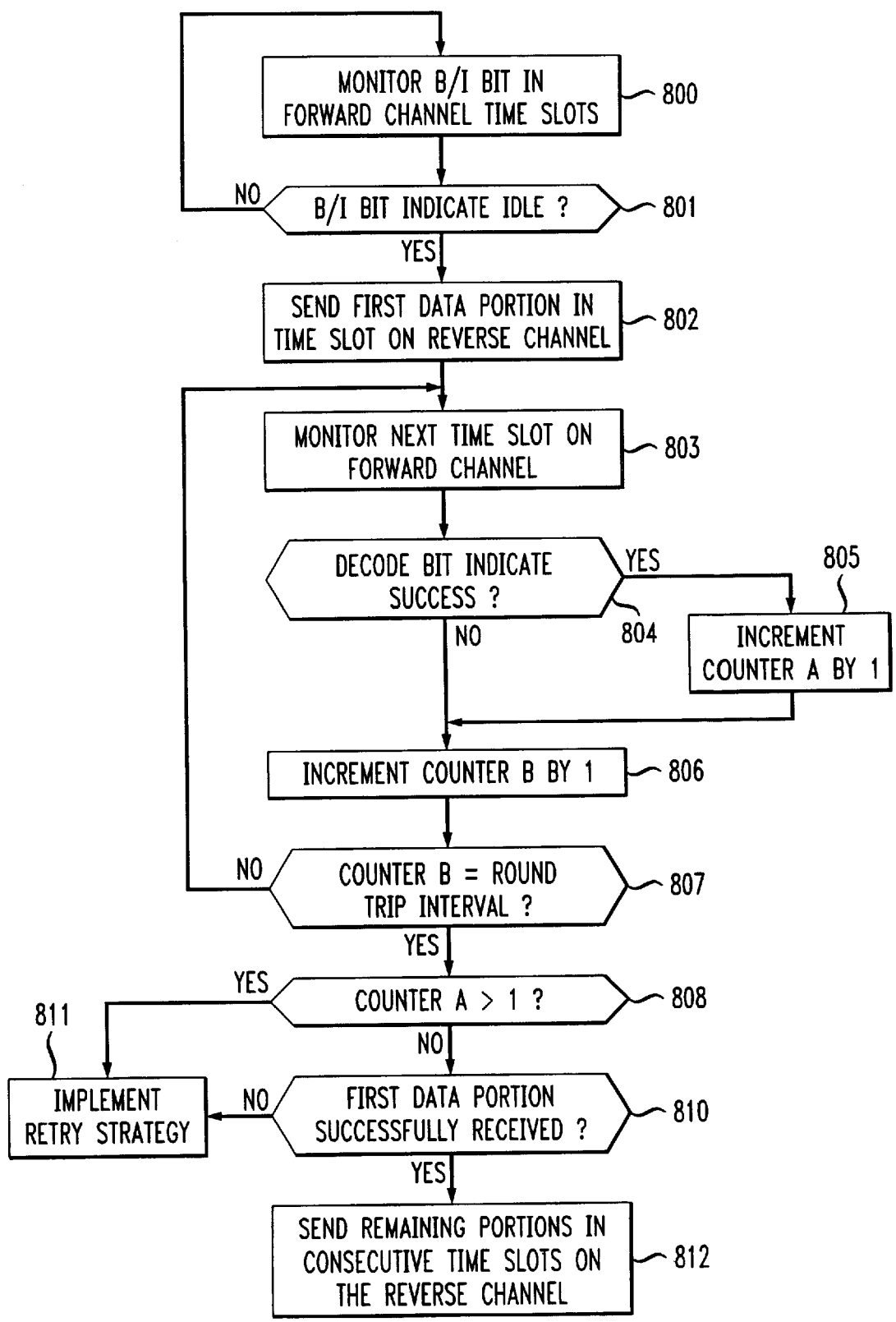
FIG. 8 provides a flow diagram for a process in accordance with the present invention which may be implemented at a remote unit to provide the communications illustrated in FIG. 6.

FIG. 8 provides a flow chart of a process that can be implemented at a remote unit for effecting the time slot control illustrated in FIG. 5. The remote unit in question hereinafter referred to as the first remote unit for ease of reference, monitors the B/I bit in forward channel time slots, step 800. The first remote unit detects whether the B/I bit indicates an idle status reflecting the availability of the reverse channel and/or the base station, step 801. If that bit does not indicate idle then the first remote unit merely monitors the B/I bit of the next time slot thus returning to step 800. If the B/I bit does indicate an idle status then the first remote unit sends a first data portion of a first data package in a time slot on the reverse channel, step 802. The first remote unit then monitors the next time slot on the forward channel, step 803. It detects whether the Decode bit indicates success, step 804. If it detects success then a counter A, previously initialized to "0", is incremented by one in step 805. This counter is used to indicate whether there have been any occurrences of the base station receiving data from a remote unit other than the first remote unit prior to receiving the first data portion send in step 802. Whether or not the decode bit indicates success, another counter, counter B (previously initialized to "0") is incremented by one. This counter keeps track of the number of time slots that have transpired along the forward channel since the transmission of the first data portion along the reverse channel. This takes place in step 806. The value of counter B is compared to the known round trip interval, here three time slots, step 807. If the counter has not reached the round trip interval then the first remote unit has not yet received the round trip time slot that corresponds to a response to the transmission of the first data portion on the reverse channel, thus the operation goes back to step 803 to continue monitoring time slots occurring within the round trip time interval. If, however, the counter B indicates that the last time slot received corresponds to the round trip time slot then the remote unit determines whether the value of counter A exceeds one. If the value is greater than one, this indicates that another remote unit has seized the reverse channel prior to the transmission of the first data portion in step 802. Thus, the remote unit then implements the predetermined re-try strategy, step 811. If the counter is not greater than one in step 808 then the remote unit checks the round trip time slot to determine whether the first data portion transmitted in step 802 has been successfully received which can be indicated by the status of the D flag in the time slot on the forward channel. This checking operation is performed in step 810. If it is detected that the data portion was not successfully received then the remote unit can implement the predetermined re-try strategy, step 811. If, on the other hand, the first data portion was successfully received then the first remote unit determines that it has successfully seized the reverse channel and begins to send remaining portions of the data package, if any, in time slots on the reverse channel. The remote unit continues monitoring the state of the busy/idle and decode success flags after the remote unit transmission terminates for a duration equal to the respective flags' round trip delays, step 812. Any negative indication, such as decode failure or premature idle, is taken as an indication of failure of one of the last transmitted slots. This causes the remote unit to enter a retransmission phase, subject to the predetermined re-try strategy.

Figure 9:
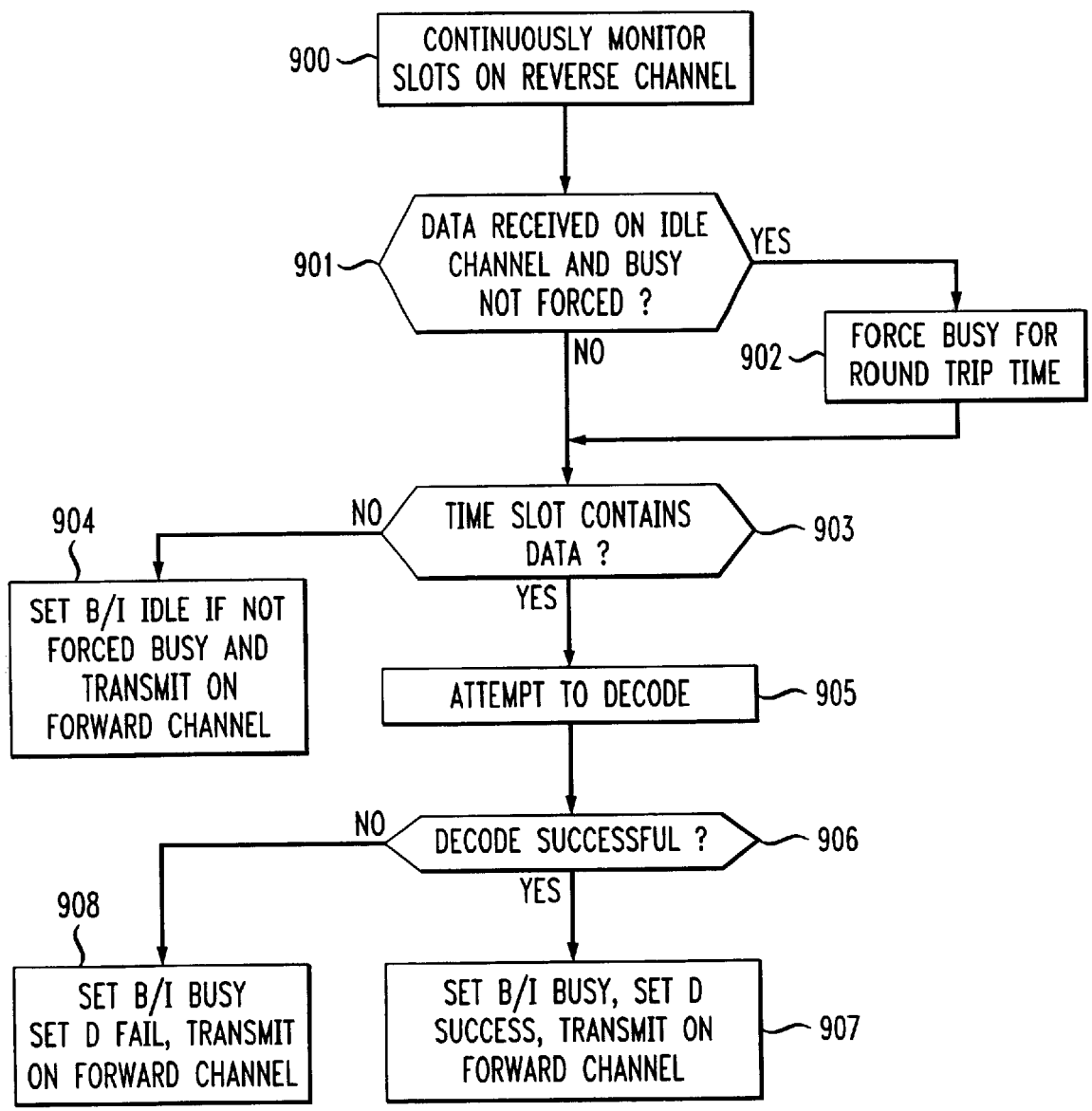
FIG. 9 provides a flow chart describing a process which may be performed at a base station to effect the communications illustrated in FIG. 5.

FIG. 9 illustrates a flow chart for implementing the process of the present invention in the base station so as to effect the time slot transmissions illustrated in FIG. 5 incorporating the notion of forcing the B/I bit high upon detection of a first data packet from a remote unit. The base station continuously monitors time slots on the reverse channel, step 900. The base unit determines whether data has been received on and idle channel and whether the B/I bit is not already forced high, step 901. If the answer is yet the base station then forces the B/I bit high for a period of time corresponding to a round trip time interval, step 902. If the answer is no, or after step 902, the base station notes whether the time slot contains data, step 903. If not, it sets the B/I to indicate idle status if the B/I is not forced high and transmits the time slot on the forward channel, step 904. If the time slot does contain data then the base station attempts to decode the data, step 905. If the decode operation is successful as detected in step 904, the base station transmits a time slot on the forward channel with the B/I bit indicating busy and the D code bit indicating success, step 907. If the decode was unsuccessful then the base station transmits a time slot on the forward channel with the B/I bit indicating busy and the decode bit indicating failure, step 908.

Thus, in accordance with this embodiment of the present invention the transmission of data along a plurality of time slots on a shared communication medium, which in one example can be a wireless air link, the remote units send only a very small portion of a data package in an attempt to seize control of the communication channel. This delaying of the transmission of the major portion of the data package reduces the number of time slots that are lost due to collisions. This improves the throughput and the usage efficiency for the shared communication medium.

While the embodiment of the present invention provides an improvement over known configurations for seizing the common communication channel, time slots on the reverse channel can still be lost due to inefficiencies. For example, referring to FIG. 5, when the data package of RU1, which takes up time slots $T_6$ to $T_8$, is complete, it is not until time slot $T_L$ in the forward channel that there is an indication that the reverse channel is available. This indication arises when the B/I bit and D bit of the forward channel time slot are reset to zero. In the meantime, namely time slots $T_9$ to $T_{11}$ slip through as unused largely as a consequence of the round trip delay that occurs before the forward channel reflects the fact that the reverse channel is now available.

A first variation of the present invention further improves the efficiency of the allocation of time slots along the reverse channel, reducing the potential negative effects of the round trip time interval on the forward channel being able to reflect the status of the reverse channel. FIGS. 6, 10, 11, 12 and 13 will be referred to in describing this variation of the present invention.

Figure 6:
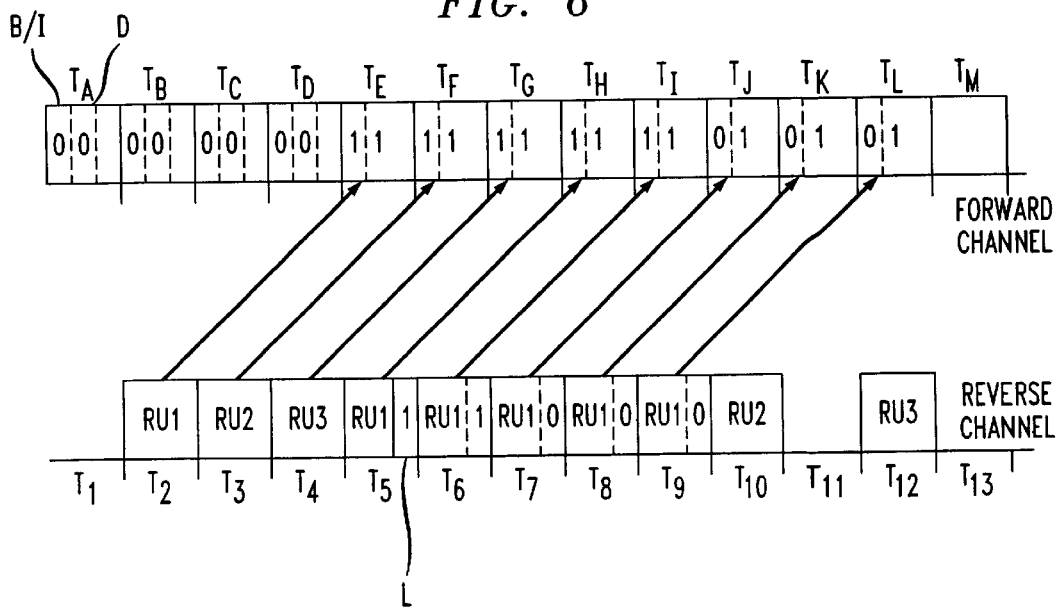
FIG. 6 illustrates a time slot representation of transmissions along communication media in accordance with a variation of the present invention.

FIG. 6 illustrates a plurality of time slots along the forward channel and the reverse channel. In this example it is again presumed that the processing time associated with the remote unit is negligible. If that is not the case, the principles described above with respect to FIG. 17 may be incorporated in this arrangement. Time slots $T_A$ to $T_M$ are provided along the forward channel while time slots $T_1$ to $T_{13}$ are shown on the reverse channel. In this configuration the forward channel includes flag information such as that described above with respect to FIG. 5. But in addition, the time slots along the reverse channel are provided with information or a flag as well. This flag represents an approximation of the length of the remaining data portion that follows a given time slot on the reverse channel. A clearer understanding of this flag and its use is achieved when one considers a situation where remote unit one (RU1) transmits in time slot $T_2$ and understands from the contents of time slots $T_C$ to $T_E$ that it, RU1, has successfully seized control of the reverse channel. It then begins to transmit the remainder of the data package from which the first data portion of time slot $T_2$ was selected. This begins in time slot $T_5$. Each time slot in the conveyance of the remainder of the data package indicates whether the portion of the data portion remaining after the transmission of that given time slot exceeds the round trip time interval. Stated a different way, a given time slot of the remaining data portion provides an indication of whether it will take more time slots than fit in the round trip time interval to transmit the data package remaining following the given time slot. In an example where the data package from RU1 is six time slots long, the round trip time interval is three time slots, and the first data package was successfully transmitted in time slot $T_2$, a second data package includes a flag, L which indicates an approximate length of the remainder of the data package following the second data portion. Here since there will be four additional time slots of data following that in time slot $T_5$, the L bit is set to one to reflect that the remainder of the data package exceeds the time slot interval. Similarly, $T_6$ includes a length indicator again reflecting that there are at least three time slots remaining to be transmitted. When the data portion in time slot $T_7$ is arranged, at that time the remaining portion of the data package falls below the round trip time interval. The length indicator is changed to reflect this fact. Here the length indicator is changed to the value zero. Then at the round trip time slot for $T_7$, namely T on the forward channel, the B/I bit is reset to indicate that the reverse channel is available. This is true as by the time the forward channel time slot $T_J$ is received at the end of the round trip interval remote unit one has completed its transmission of its data package sending its last time slot $T_9$.

Since the forward channel has changed the B/I indicator, RU2, which successfully transmitted a data package in time slot $T_3$ but withheld any further transmission in view of RU1's prior seizure of the reverse channel, can now attempt to send a second data package as early as the first time slot following the completion of RU1's data package. This removes the problem of the round trip interval down time which might otherwise exist in the first embodiment of the present invention.

As with the example of FIG. 5, FIG. 6 shows a scenario in which the round trip time slots following RU1's initial transmission ($T_3$ and $T_4$) are occupied. To compensate for problems that might arise where those slots are empty, the base station can employ the technique of forcing the B/I bit high in this variation of the invention in the same way that technique was described in relation to the first embodiment of FIGS. 5, 8 and 9.

Figure 10:
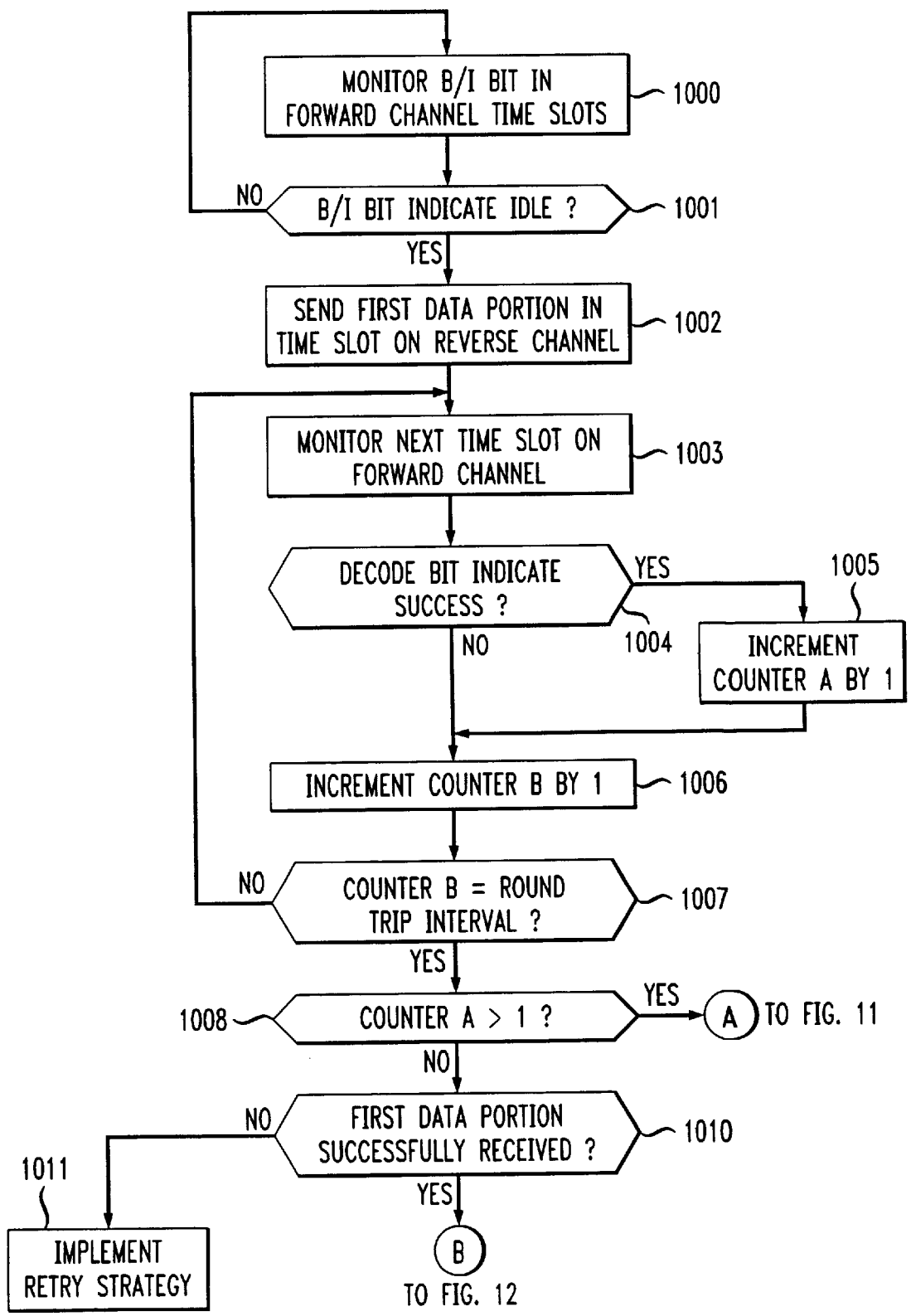
FIGS. 10 to 12 provide flow diagrams for describing a process that can be implemented at a remote unit to effect the communications illustrated in FIG. 6.
Figure 11:
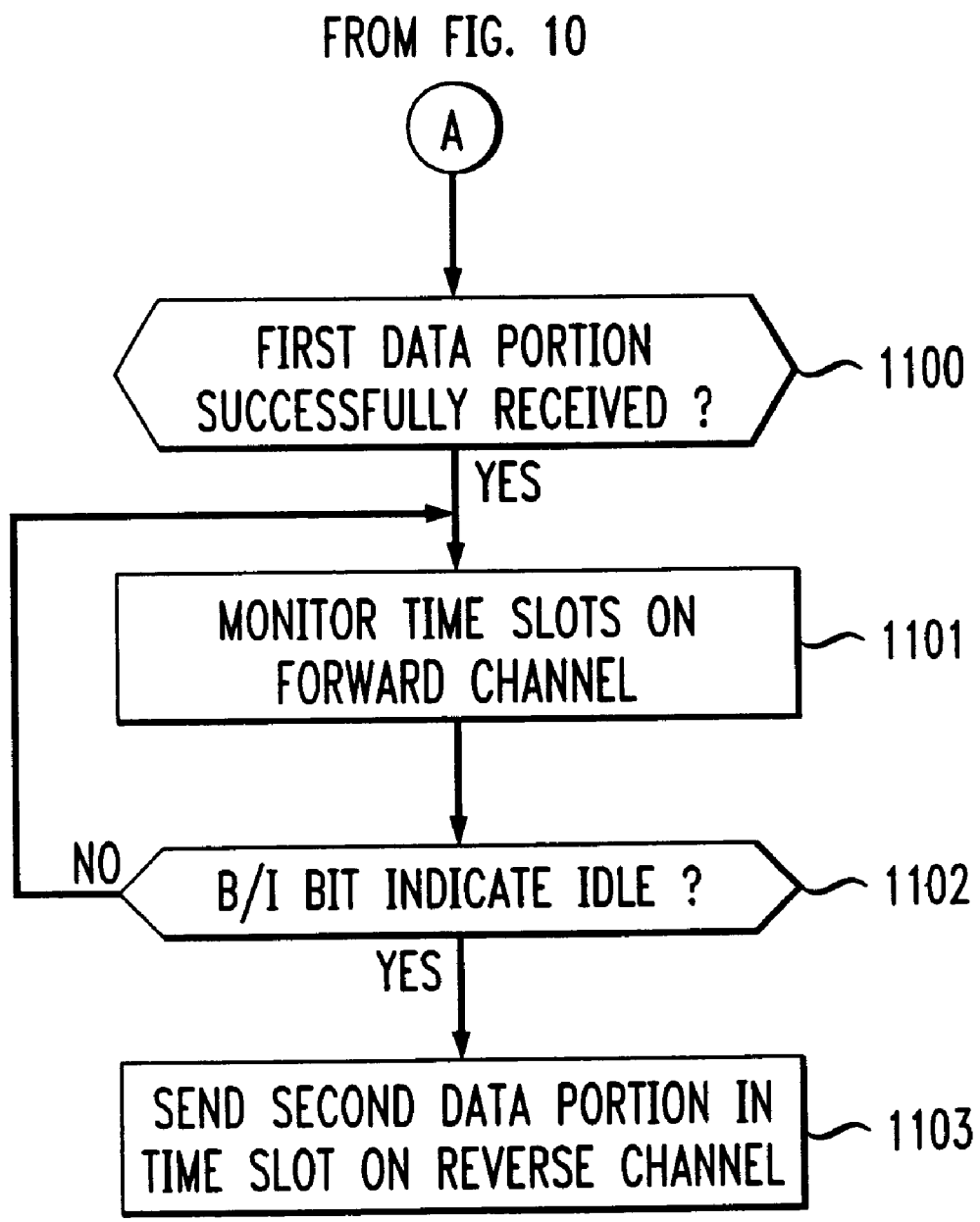
Figure 12:
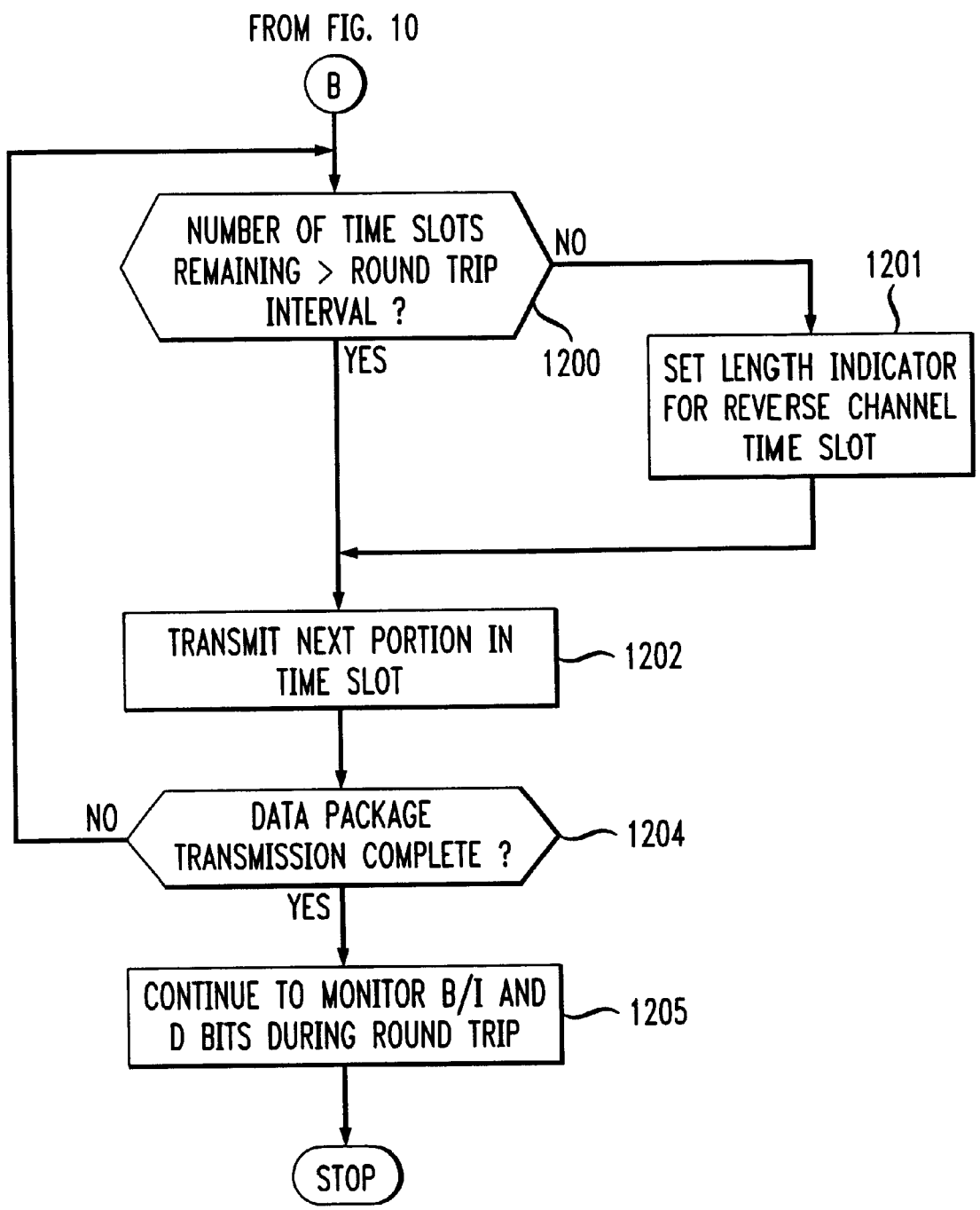
Figure 13:
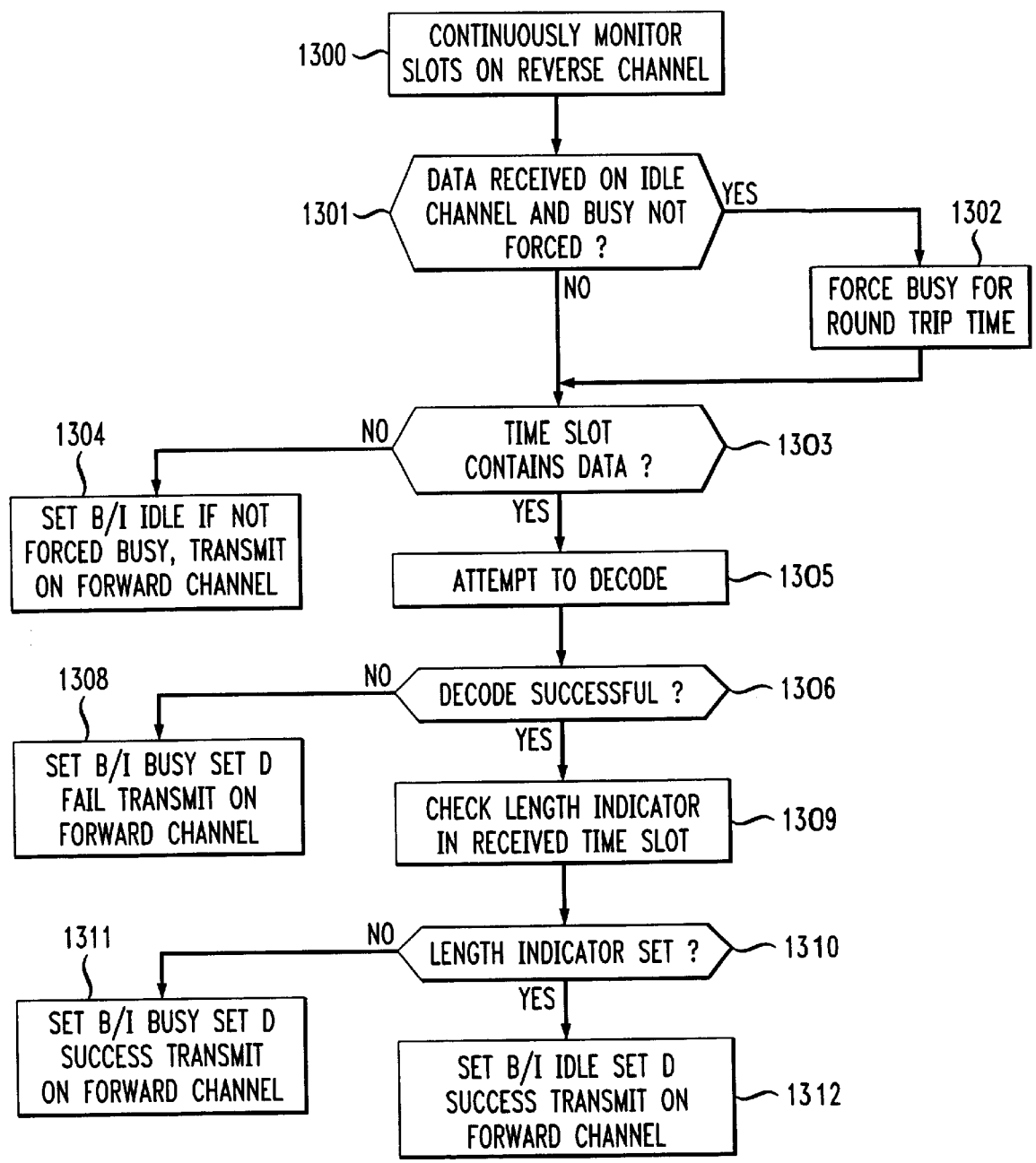
FIG. 13 provides a flow chart describing a process that can be implemented at a base station to effect the communications illustrated in FIG. 6.

FIGS. 10 to 12 provide a flow chart for a process that can be implemented at the remote unit to achieve the time slot control referred to in FIG. 6. FIG. 13 provides a flow chart for describing a process that can be implemented at the base station for effecting this time slot control.

Referring to FIG. 10 it can be seen that steps 1000 to 1008, 1010 and 1011 correspond to steps 800 to 808, 810 and 811 in FIG. 8. For sake of brevity, description of those steps will not be repeated here. The process differences arise in this variation of the invention when the counter indicates that at least one other remote unit has successfully seized the reverse channel prior to the first remote unit at decision 1008 and the remote unit inserts additional information into the time slots when it sends remaining portions of the data package on the reverse channel as will be described with relation to FIG. 12. Once the counter A is detected to exceed one, thereby indicating that another remote unit has preceded the first remote unit in seizing the reverse channel, the method proceeds to step 1 100 in FIG. 11. As explained before, the steps shown in FIG. 11 are optional and depend on the choice of retransmission techniques. At that point a decision is made as to whether the first data portion was successfully received. If yes then the base station continues to monitor time slots on the forward channel, step 1101 until it detects that the B/I bit indicates an idle status in step 1102. Once such an idle status is detected the remote unit sends the second data portion in a time slot on the reverse channel, step 1103. This second data portion is a second attempt by the first remote unit to seize control of the reverse channel. After transmitting this second data portion the remote unit will monitor the forward channel and make decisions in much the same manner as it did after the transmission of the first data portion until it determines that it, the first remote unit, has seized control of the reverse channel. At that time it will begin to transmit the remainder of the data package in a manner consistent with the steps shown in FIG. 12. Once the remote unit has determined that it has seized control of the reverse channel it determines the number of time slots remaining and makes a decision as to whether the number of time slots remaining exceeds the round trip interval, step 1200. In one embodiment if the decision is that the time slots remaining do not exceed the round trip interval the length indicator for the reverse channel time slot is reset in one example to the value of zero, step 1201. In either case, the next portion of the data package is inserted into the time slot and transmitted, step 1202. A decision is then made as to whether the data package transmission is complete, step 1204. If not, then the operation of the remote unit returns to step 1200 and repeats those steps 1200 to 1204 until such time as the data package transmission is complete at which time the remote unit stops transmitting.

At step 1205, the remote unit continues monitoring the state of busy/idle and decode success flags following the termination of the transmission as described with respect to step 812. If the base asserts a premature or look-ahead idle for the benefit of other waiting remote units, the sending remote unit may ignore that idle indication and not consider it a failure of the base to detect the remote unit's final blocks. The remote unit may instead rely solely on the decode success indicator, which must show success for all remaining blocks or else the remote unit must engage in some kind of retry. Here the flags may take on multiple meanings depending on the stat of the channel. There are many policies which could be implemented.

In much the same way the remote unit process for the variation of the present invention is similar to the first embodiment, the operation of the base station in this variation of the present invention also is similar to the operation of the base station in the first embodiment of the invention. It is presumed here that the base station employs the technique of forcing the B/I bit high over a predetermined interval to avoid data packet collisions. The "look ahead" feature of this variation of the present invention does not require implementation of this collision avoidance technique. Comparing the flow charts of FIGS. 9 and 13 it is clear that steps 1300 to 1306 correspond to steps 900 to 906. Furthermore, step 1308 corresponds to step 908. These similar steps will therefore not be redescribed for the sake of brevity. The difference between the operations of the base stations arise in the replacement of step 907 with new steps 1309, 13010, 1311 and 1312. If the base station detects data in a time slot on the reverse channel and successfully decodes that data the base station then checks the length indicator in the received time slot, step 1309. The base station then makes a decision as to whether the length indicator is set to reflect that the remaining portions of the data package with which this time slot is associated is greater than the round trip time interval. If the length indicator detected by the base station indicates that the remote unit will complete its data transmission before the expiration of the round trip time interval then the base station transmits a time slot on the forward channel that has its B/I bit indicating an idle status and its decode bit indicating success, step 1312. If, on the other hand, the remainder of the data package of which the successfully decoded time slot is a part exceeds the round-trip time interval then the base station will transmit a time slot on the forward channel that has its B/I bit indicating a busy status and the decode bit indicating success, step 1311. Thus, depending on the transmission in step 1311 and 1312, the remaining remote units associated with the base station will be advised as to the availability of the reverse channel for sending either a first portion of a data package from any of those other remote units or some other portion of a data package where preceding portions of the data package had been successfully received by the base station.

As indicated above, this modification to the present invention alleviates an inefficiency in time slot usage which might otherwise arise due to round trip time intervals following the completion of transmission of a data package to the base station.

While this modification to the present invention provides a further advantage in the control of time slot assignment in the shared communication medium, efficiency in time slot assignment could still be improved. For instance, in FIG. 6 in accordance with the modified embodiment of the present invention where RU2 successfully transmitted a first portion of its data package in times slot $T_3$ and RU3 successfully transmitted a first portion of its data package in time slot $T_4$, both of the remote units must again initiate attempts to seize control of the reverse channel after RU1 has completed its transmission. In that instance both RU2 and RU3 will look for an idle status of the reverse channel as reflected by the time slot in the forward channel and will send a single time slot's worth of data on the reverse channel again attempting to seize control in much the same manner as it attempted to do in sending the first data portion. This can again create situations where time slots go unused on the reverse channel. It would be beneficial if there was some way to further improve the efficiency of time slot usage on the reverse channel.

Figure 7:
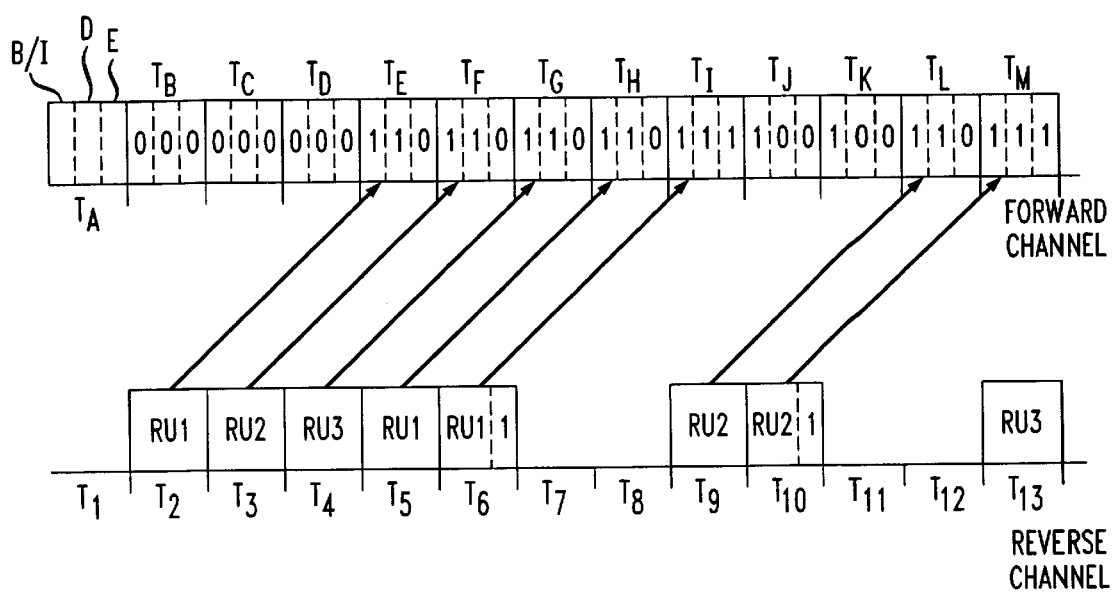
FIG. 7 illustrates a time slot representation of transmissions along communication media in accordance with a second variation of the present invention.

FIG. 7 illustrates a time slot arrangement whereby the various remote units associated with a base station can detect their position in a queue for seizing the reverse channel. The queue need not be a physical construct, but instead is some representation of a given remote unit's position in line for seizing the reverse channel. In this modification to the present invention, each remote unit detects how many other remote units have successfully seized control of the reverse channel by monitoring the contents of the time slots that occur during the round trip time interval associated with that remote unit's initial transmission. For example, in time slot $T_4$ remote unit RU3 transmits a first portion of its data package because it detects the time slot $T_D$ in the forward channel indicates that the B/I bit reflects an available reverse channel. Unbeknownst to remote unit 3 at its transmission time in slot $T_4$, RU1 and RU2 have previously sent first portions of their respective data packages to the base station. In time slot $T_E$ the D bit reflects successful receipt of the data from RU1. RU3 notes this event and detects that it occurs prior to the round trip time slot $T_G$ associated with its transmission in time slot $T_4$. It thus notes that at least one remote unit has preceded it in seizing the reverse channel. Furthermore, as it monitors additional time slots in the round trip time interval it notes that time slot $T_F$ reflects that RU2 has also seized the reverse channel. RU3 now understands that it is third in line to utilize the reverse channel for sending its data package. When RU1 receives the information in time slot $T_E$ in the forward channel it understands that it has successfully seized the reverse channel and begins to transmit the remainder of its data package, here time slots $T_5$ and $T_6$. In the last data package RU1 indicates that it is completing its data package transmission. This ending of data package transmission is reflected in time slot T, in the forward channel which follows $T_6$ by the requisite round trip time interval. RU2 which has detected that it was second in line to transmit over the reverse channel notes one of the remote units that had control has ended its transmission as indicated by the status of the E flag in time slot $T_1$. RU2 then begins to transmit the remainder of its data package in time slots $T_9$ and $T_{10}$. As it completes the transmission of its data package in time slot $T_{10}$, RU2 includes an indicator of the end of its data package transmission. Time slot $T_M$ includes an appropriate indication of this end of transmission in the E flag of that forward channel time slot. RU3 detecting that both $T_1$ and $T_M$ have indicated ends of transmissions, RU3 then knows that two remote units which preceded it in line to seizing the reverse channel have completed their transmissions and RU3 may now seize the reverse channel. It does so in transmitting its second portion of its data package in time slot $T_{13}$.

This variation of the present invention can include the notion of keeping the B/I bit artificially high to prevent other remote units from jumping in. In particular, the base station can detect how many remote units are in the seizure queue and can hold the B/I bit high until such time that the base station detects that the seizure queue is empty.

Additional efficiencies can be achieved by combining the look ahead feature in FIG. 6 with the seizure queuing concept described here in connection with FIG. 7. Namely, remote unit one for instance would include in its data package transmissions an indication that the remaining time slots to be transmitted are less than the round trip time interval. If for example this information was transmitted in time slot $T_5$ then the E flag could be set in forward channel $T_H$ which would allow RU2 to seize control of the reverse channel even earlier. Depending upon the size of the data packages and the length of the round trip time interval, it may be possible to substantially fill all of the time slots while building up queues or lines of remote units seeking to seize control of the reverse channel thereby vastly enhancing the time slot usage in the reverse channel.

Also, it should be noted that in this example it is again presumed that the processing time associated with the remote unit is negligible. If that is not the case the principles described above with respect to FIG. 17 may be incorporated into this variation of the present invention.

Figure 14:
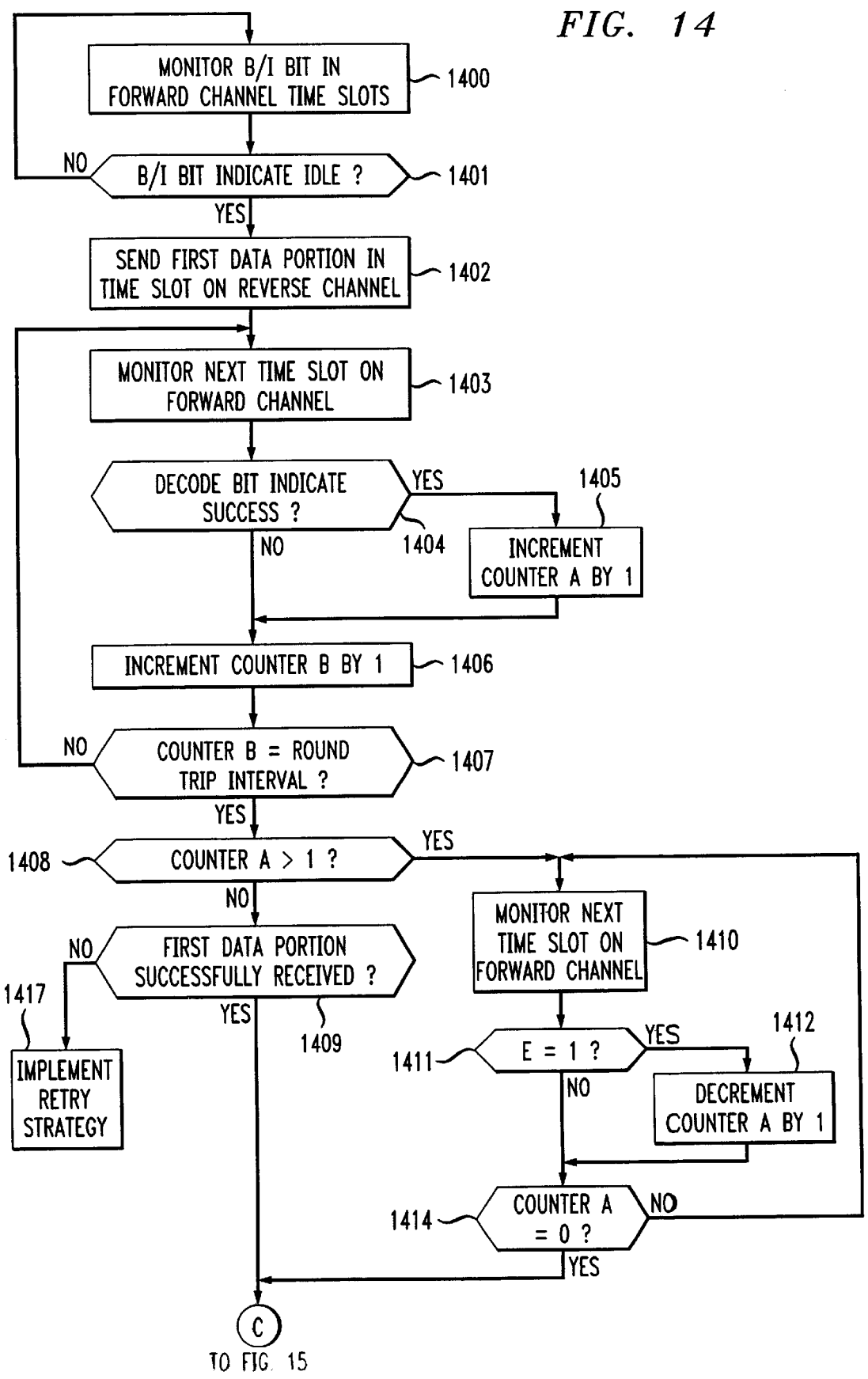
FIGS. 14 and 15 illustrate a flow chart for describing a process which can be implemented at a remote unit to effect the communications illustrated in FIG. 7.
Figure 15:
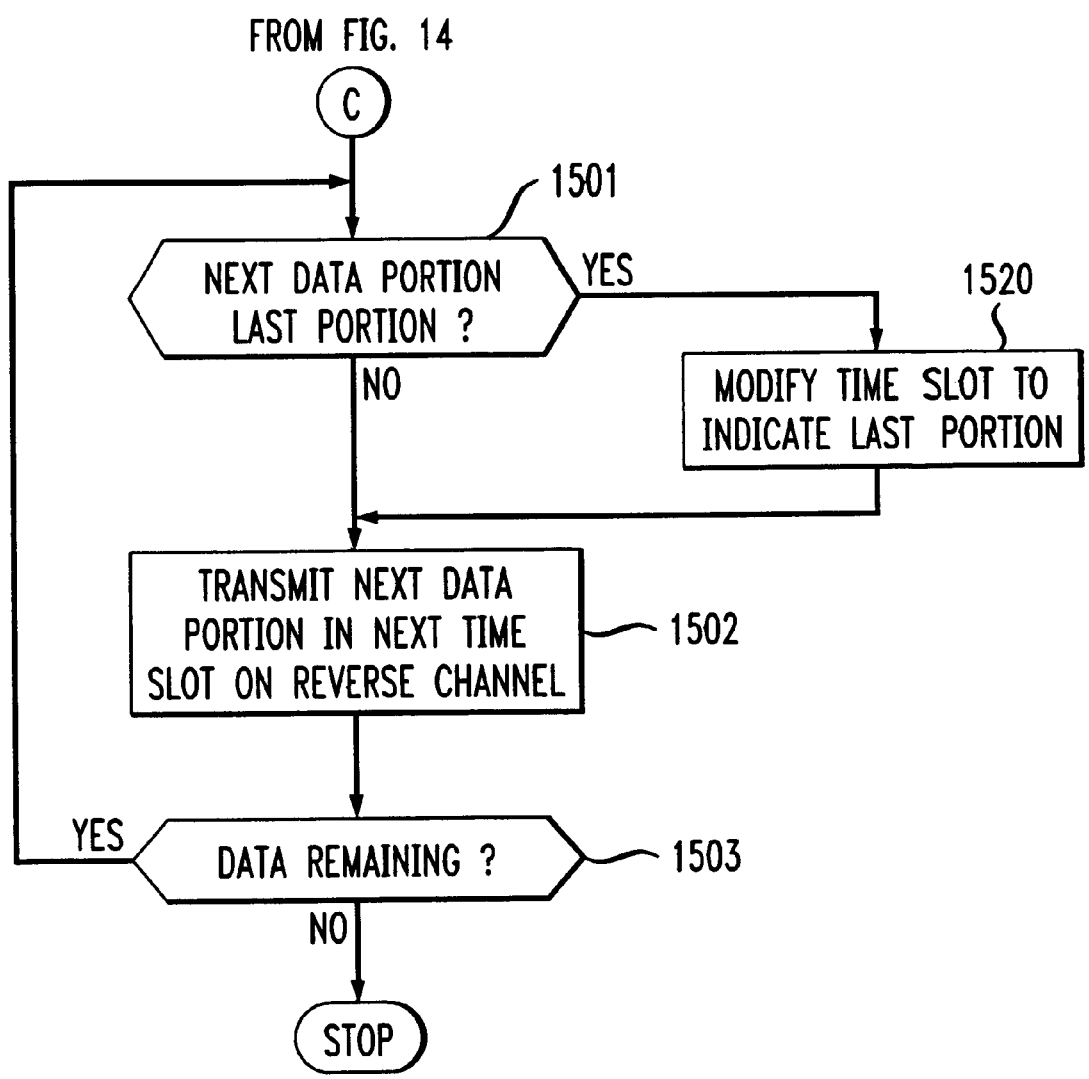

The flow charts of FIGS. 14 and 15 are helpful for explaining the implementation of a process in a remote unit to effect the time slot assignments illustrated in FIG. 7. Steps 1400 to 1408 correspond to steps 800 to 808 and will not be described in this portion for sake of brevity. This variation of the present invention, however, deviates from the first embodiment in what transpires at the base unit if counter A indicates that one or more other remote units are in line to seize the reverse channel prior to this first remote unit. It also varies the information provided in the time slots on a reverse channel where additional portions of the data package of the first remote unit are transmitted along the reverse channel.

If, at the end of the round trip interval as reflected by the decision as step 1407 the counter A indicates that one or more other remote units are in line to seize the reverse channel prior to the first remote unit, then the first remote unit monitors the next time slot on the forward channel, 1410. It examines whether the E bit is one thereby reflecting that one of the prior remote units has completed its transmission of the data package, step 1411. If so, then the counter A is decremented by one to reflect that this first remote unit has now moved up one position closer to seizing control of the reverse channel, step 1412. Then the remote unit checks the A counter value to see if the value is zero. A zero value indicates that the remote unit is next in line to seize the channel. If so then it continues to the steps reflected in the flow diagram of FIG. 15. If the counter A does not equal zero then the remote unit knows that there is at least one remote unit still ahead of it in line for seizing the reverse channel and returns to monitor the next time slot on the forward channel. This technique requires some strategy for determining the end of a transmission from a remote unit. The strategy could be passive, that is the base station simply infers an end of transmission when the detected energy level falls below some threshold. Alternatively, as described with reference to FIG. 15, a more active strategy could be pursued.

In such an active strategy, once the remote unit has detected that it is free to seize the reverse channel it then determines whether the next data portion which it is ready to transmit is the last data portion, step 1501. If this condition is true then the remote unit modifies the time slot on the reverse channel to indicate that the data inserted is the last portion of the data package. That next data portion is then transmitted in the next time slot on the reverse channel, step 1502. The remote unit determines whether any data remains in the data package, step 1503. If not, the remote unit stops the transmission process until it has another data package ready for transmission to the base station, step 1505. If there is data remaining then the method loops back to 1500 and repeats steps 1500 to 1503 until no data of the data package remain.

The base stations continuously monitors slots on the reverse channel, step 1600. The station then detects whether there is data received on an idle channel and the B/I bit is not forced high, step 1601. If both conditions are met then a counter Q (initialized to "0") is set to "1", step 1602. The station then forces the B/I bit to busy until Q returns to "0" at some later time, step 1603. Steps 1604 to 1607 correspond to steps 903 to 906 and will not be described for sake of brevity. If the decode is not successful then the basic station will transmit a time slot on the forward channel and that slot will have the B/I bit indicate busy, the D bit indicate failure and E=0, step 1608. If the decode is successful then the base station determines whether it corresponded to a time within a first round trip time, step 1609. If yes, then Q is incremented by 1, step 1610. The base station then determines if it has received the end bit, step 1611. If not, then it transmits a time slot on the forward channel with B/I busy, D successful, E=0, step 1612. If it has detected the end bit it performs steps 1613 and 1614, namely it transmits a time slot on the forward channel that has B/I busy, D successful and E=1 (step 1613) and it decrements Q. When Q=0 this means the seizure queue is empty and it also means that the base station can release the B/I bit, no longer artificially forcing it high.

Figure 16:
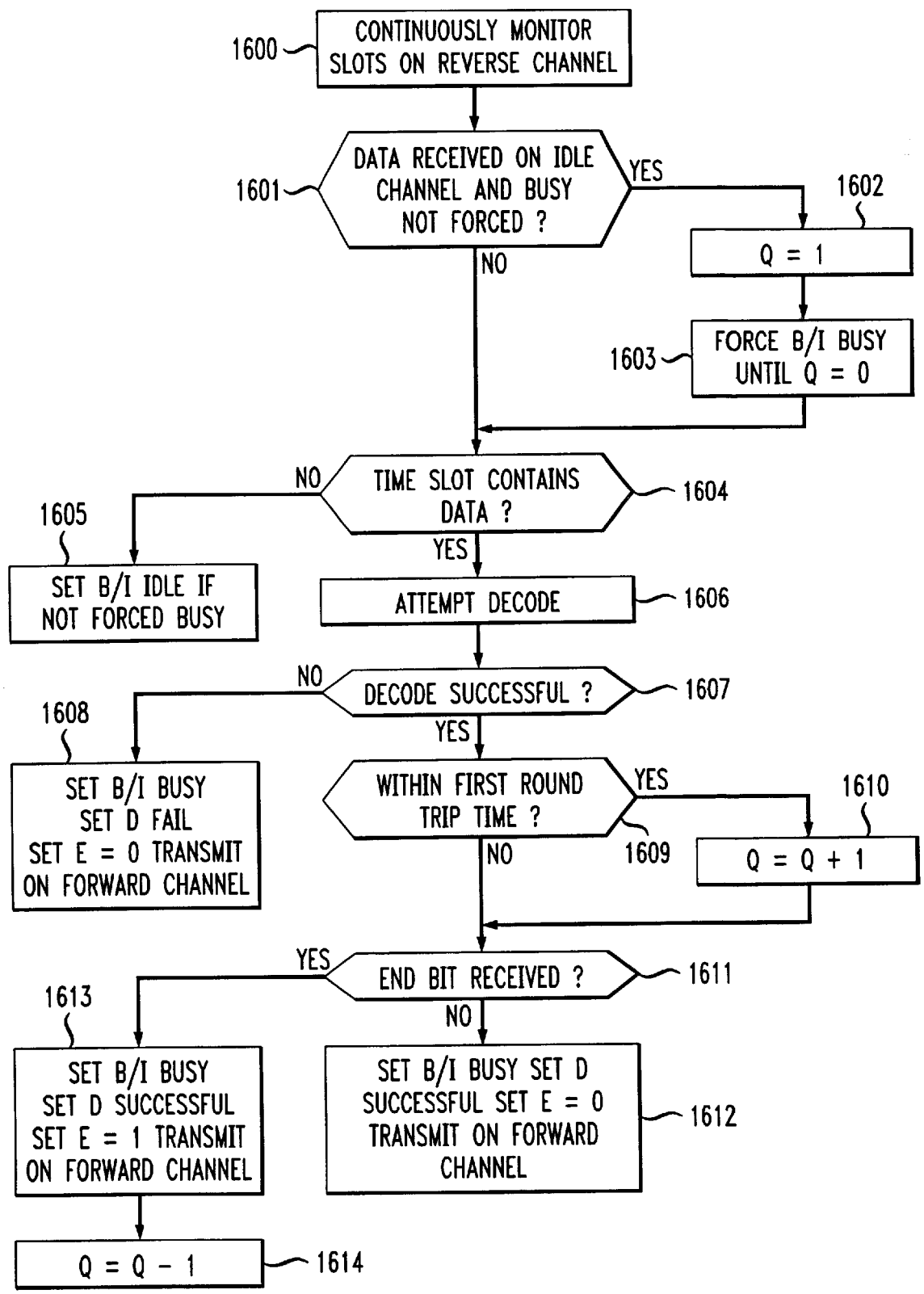
FIG. 16 illustrates a flow chart for a process which can be implemented at a base station for effecting the communications illustrated in FIG. 7.

As described above, the base station and the remote units can be modified to incorporate a combination of the look ahead features of FIGS. 10–13 and the seizure queuing features of FIGS. 14 to 16 to further improve the efficiency of time slot usage along the reverse channel.

It should be understood that this application has described three techniques for improving the sharing of resources along a communication medium especially where the medium uses time slots to permit transmission of information. While an embodiment has been described in connection with a fixed wireless configuration it should be recognized by those of skill in the art that the present invention could be employed in other time division communication schemes where a plurality of time slots are shared by a plurality of communication devices. The communication medium could be air links, wirelines, optical fiber, etc. Furthermore, it should be noted that the exemplary embodiments of the present invention described above refer to using flags that constitute single bits in respective time slots and values have been attributed to those flags to reflect different states. One of ordinary skill in the art would recognize that alternative values could be applied to the flags and achieve the same effect so long as there was a clear understanding between the remote unit and the base station of the meaning of the respective flag states. Also, alternatives to single bit flags could be provided to convey the same types of information between the remote unit and the base station over the reverse and forward channels.

What is claimed is:

1. A method for enhancing throughput in a data channel between a remote unit and a base unit in a wireless network, the method comprising the steps of:

receiving a first portion of a data package from the remote unit in a first time slot on said data channel;

changing a status flag in a time slot for transmission along a channel for communication to the remote unit;

at a time occurring subsequent to transmission of said time slot including the changed status flag;

receiving a second portion of said data package from the remote unit in another time slot on said data channel;

determining from said second portion an approximation of time needed to transmit a remainder of said data package; and wherein when said approximation exceeds a predetermined value indicating a busy status using a status flag in another time slot along said channel for communication to said remote unit, and when said approximation is less than a predetermined value, indicating a non-busy status using the status flag in said another time slot along said channel for communication to said remote unit.

2. The method of claim 1 wherein said predetermined value corresponds to a round trip time that represents the time needed for data in a time slot to be propagated to said base unit and processed by said base unit and for responsive data to be propagated from the base unit to the remote unit and processed at the remote unit.

3. The method of claim 1 wherein said step of determining includes detecting a state of a data length tag in said another time slot on said data channel.

4. A method for improving data throughput in a wireless network that includes a plurality of remote units, a base unit, a forward channel carrying information from said base unit to said plurality of remote units and a reverse channel, shared by the plurality of remote units for carrying information to the base unit, wherein said forward and reverse channels include a plurality of time slots, the method comprising the steps of:

detecting an idle status in a time slot on said forward channel;

forwarding a first portion of a data package in a first time slot on said reverse channel;

receiving an indication that said first portion has been successfully received by the base unit;

transmitting a second portion of said data package in a second time slot of the reverse channel that follows said first time slot by at least one round trip time interval, said interval corresponding to a time period that includes a time for propagating a time slot to the base unit on the reverse channel, a time for processing a time slot at the base unit and a time for propagating a response along said forward channel to the remote unit and processing the response at the remote unit;

wherein said second portion includes an approximation of a length of a remaining portion of the data package.

5. The method of claim 4 wherein said approximation includes a flag indicating whether the length of said remaining portion exceeds a predetermined length.

6. The method of claim 5 wherein said predetermined length corresponds to said round trip time interval.

7. The method of claim 4 wherein said indication that said first portion has been successfully received includes a successful decode flag on said forward channel in a time slot received at the end of the round trip interval after the transmission of said first portion of the data package.

8. A method for enhancing throughput in a data channel between a remote unit and a base unit in a wireless network, the method comprising the steps of:

at a remote unit, detecting an idle status in a time slot received from the base unit, transmitting a first portion of a data package in a time slot sent to the base unit, delaying a transmission of a remainder of said data package until said remote unit receives an indication that it has successfully seized the data channel;

when the remote unit receives an indication that it has successfully seized the data channel transmitting a second portion of said other package to said base unit, said second portion including an indication of whether a remainder of said data package exceeds a predetermined number of time slots; and at the base unit, receiving said first portion, and if the remote unit has successfully seized the data channel, sending an indicator in a time slot to said remote unit, receiving said second portion, detecting said indication of whether the remainder of said data package exceeds said predetermined number of time slots, and if said indicator indicates that the remainder of said data package does not exceed said predetermined number of time slots, transmitting an indicator of idle status in a time slot to the remote unit.

9. The method of claim 8 wherein said predetermined number of time slots correspond to a round trip time interval associated with the time it takes to propagate a time slot from the remote unit to the base unit, to process a received time slot at the base unit and to propagate a response time to the remote unit and process the response at the remote unit.

10. A method for improving data throughput in a wireless network that includes a plurality of remote units, a base unit, a forward channel carrying information from said base unit to said plurality of remote units and a reverse channel, shared by the plurality of remote units for carrying information to the base unit, wherein said forward and reverse channels include a plurality of time slots, the method comprising the steps of:

transmitting a first block of data of a data package in a first time slot on the reverse channel;

receiving the first block of data at the base unit;

transmitting a channel seizure indicator in a time slot on said forward channel;

receiving said channel seizure indicator at said remote terminal at a time that follows the transmitting of said first block by a round trip time interval;

if said seizure indicator indicates that the remote unit that transmitted said first block has successfully seized the reverse channel the remote unit transmits a plurality of additional blocks of data that constitute a remainder of said data package in a plurality of time slots of the reverse channel, wherein each given time slot includes an approximation of the number of time slots needed to transmit a remainder of the data package following said given time slot; and detecting, at the base unit the respective approximations of the number of time slots needed to transmit the remainder of the data package that is included in the time slots on the reverse channel, and transmitting an indication of idle status along said forward channel when the detected approximation is less than a predetermined time interval.

11. The method of claim 10 wherein said predetermined time interval comprises said round trip time interval.

\* \* \* \* \*

UNITED STATES PATENT AND TRADEMARK OFFICE
CERTIFICATE OF CORRECTION

PATENT NO. : 6,404,753 B1
DATED : June 11, 2002
INVENTOR(S) : Chien et al.

It is certified that error appears in the above-identified patent and that said Letters Patent is hereby corrected as shown below:

<u>Title page,</u>
Item [75], Inventors, add the following inventor:

-- Jin-Meng Ho, Collin County, TX (US) --

Signed and Sealed this

Twenty-fourth Day of August, 2004

JON W. DUDAS
*Director of the United States Patent and Trademark Office*